United States Patent [19]

Nomura et al.

[11] E Patent Number: Re. 31,989

[45] Reissued Date of Patent: Sep. 24, 1985

[54] MOTORCYCLE ENGINE EXHAUST SYSTEM

[75] Inventors: Kazuhiko Nomura, Iwata; Satoru Ichikawa, Hamamatsu, both of Japan

[73] Assignee: Yamaha Hatsudoki Kabushiki Kaisha, Japan

[21] Appl. No.: 643,411

[22] Filed: Aug. 22, 1984

Related U.S. Patent Documents

Reissue of:

[64] Patent No.: 4,422,519
Issued: Dec. 27, 1983
Appl. No.: 343,020
Filed: Jan. 26, 1982

U.S. Applications:

[63] Continuation of Ser. No. 78,697, Sep. 25, 1979, abandoned.

[30] Foreign Application Priority Data

Sep. 29, 1978 [JP] Japan ..... 53-119181

[51] Int. Cl.[4] ..... B62D 61/02; F01N 1/08; F01N 7/08

[52] U.S. Cl. ..... 180/219; 180/89.2; 180/226; 180/296; 181/228; 181/238; 181/272

[58] Field of Search ..... 181/204, 211, 228, 229, 181/238-240, 262, 263, 272, 275; 180/89.2, 218, 225, 226, 229, 291, 296; 60/312-314, 323, 324; 123/52 M, 52 V, 198 R

[56] References Cited

U.S. PATENT DOCUMENTS

| | | | |
|---|---|---|---|
| 2,537,203 | 1/1951 | Bourne et al. | 181/238 X |
| 2,649,083 | 8/1953 | Vogel et al. | 60/313 |
| 2,940,249 | 6/1960 | Gospodar | 181/240 X |
| 3,453,824 | 7/1968 | Biesecker | 60/313 |
| 3,937,484 | 2/1976 | Morioka | 180/219 |
| 3,949,829 | 4/1976 | Honda et al. | 180/225 X |
| 4,204,585 | 5/1980 | Tsuboi et al. | 180/219 |
| 4,226,296 | 10/1980 | Higaki | 180/219 |

FOREIGN PATENT DOCUMENTS

| | | | |
|---|---|---|---|
| 447413 | 5/1936 | United Kingdom | 181/211 |

*Primary Examiner*—Thomas H. Tarcza
*Attorney, Agent, or Firm*—Ernest A. Beutler

[57] ABSTRACT

A motor cycle includes a frame, a front and rear wheel, and an engine mounted to the frame which has at least two exhaust pipes. A muffler is mounted to the frame beneath the engine, and both exhaust pipes discharge into the muffler. At least one tailpipe exhausts from the muffler. The silencing volume of the muffler can enable a shorter-than-usual tailpipe to be used, which need not interfere with access to the rear wheel axle.

21 Claims, 5 Drawing Figures

MOTORCYCLE ENGINE EXHAUST SYSTEM

Matter enclosed in heavy brackets [ ] appears in the original patent but forms no part of this reissue specification; matter printed in italics indicates the additions made by reissue.

This is a continuation of application Ser. No. 78,697, filed Sept. 25, 1979, now abandoned.

FIELD OF THE INVENTION

This invention relates to engine exhaust systems, and in particular to an exhaust system for an engine that includes a plurality of exhaust pipes.

BACKGROUND OF THE INVENTION

In order sufficiently to silence its exhaust noise, a motorcycle driven by an engine having a large displacement must have a muffler with a large capacity. When engine displacements increased conventional, motorcycles have had to increase the volume of their mufflers. However because the exhaust system usually extends its tailpipe in the vicinity of the rear wheel axle of the motorcycle, access to the rear axle and rear wheel has been impeded, thereby rendering maintenance and repair much more difficult. With this in mind, some motorcycles are designed to have their tailpipe shortened so its trailing end terminates forwardly of the rear axle. Then the difficulty arises that the capacity of the tailpipe may become insufficient, and the desired silencing performance cannot be attained.

It is an object of this invention to provide an exhaust system with a suitably short tailpipe, and a suitably large muffling capacity.

BRIEF DESCRIPTION OF THE INVENTION

An exhaust system according to this invention has a muffler disposed below an engine having at least two exhaust pipes. The engine exhaust gases are introduced into the muffler through the exhaust pipes. A tailpipe exhausts to atmosphere from the muffler, and the necessary capacity and length of the tailpipes are so reduced as to provide adequate access to the rear wheel of the motorcycle, while still providing a sufficiently large capacity in the exhaust muffler system as a whole.

According to a preferred but optional feature of the invention the muffler is multiply-chambered, with the exhaust pipes discharging into one chamber, and the tailpipes exhausting from another. The chamber are interconnected.

The above and other features of this invention will be fully understood from the following detailed description and the accompanying drawings, in which.

DETAILED DESCRIPTION OF THE INVENTION

Figure 1:
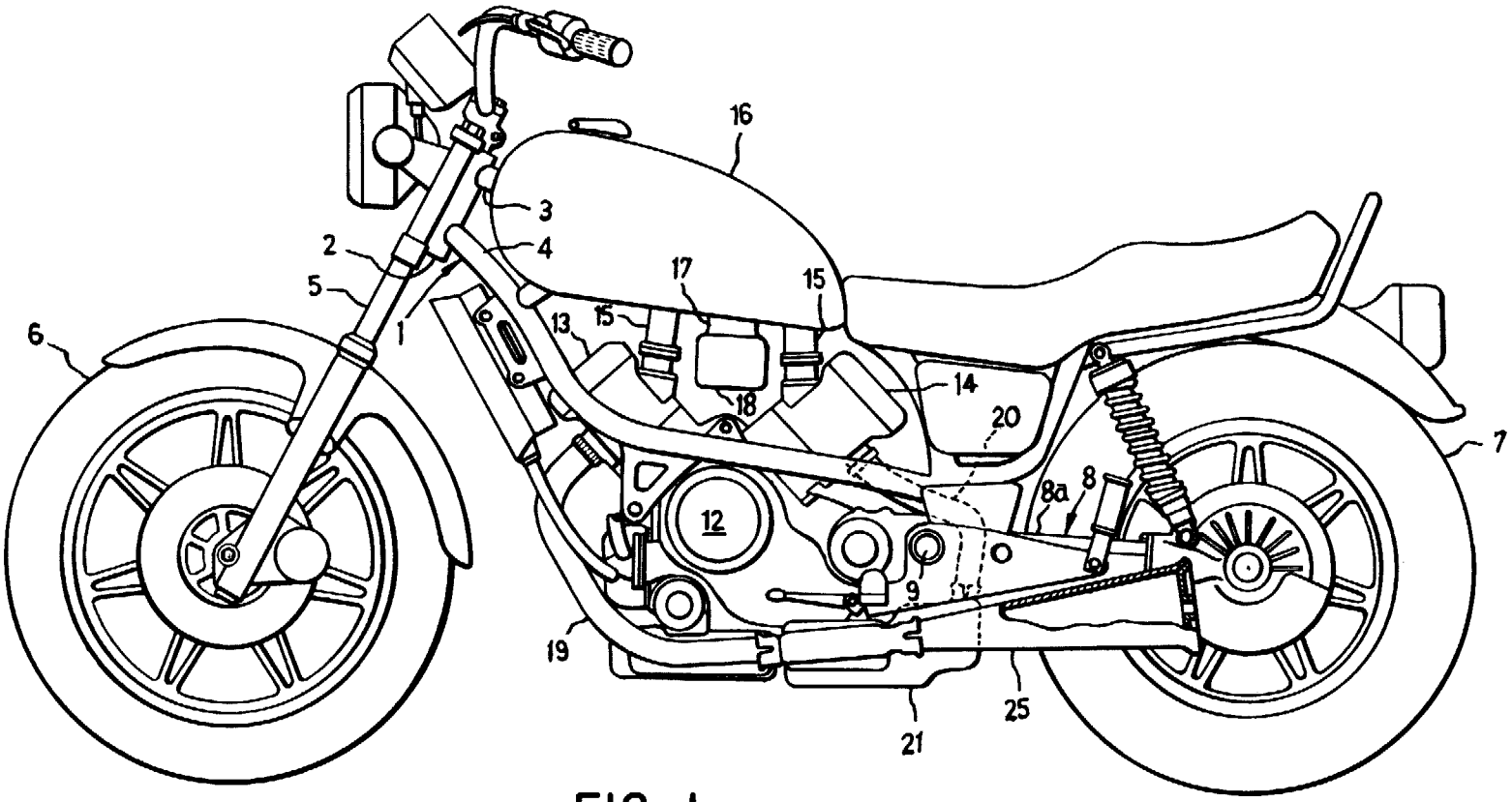
FIG. 1 is a side elevation showing a motorcycle, to which one embodiment of the present invention is applied.
Figure 2:
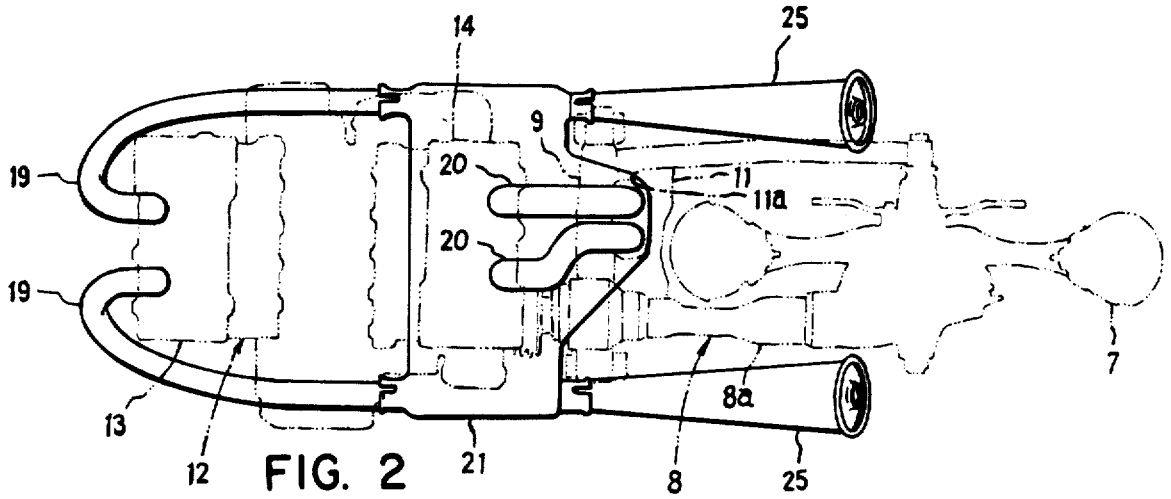
FIG. 2 is a top plan view of FIG. 1 showing the exhaust system of the motorcycle.

FIG. 1 shows a main frame 1 which is equipped with a steering head pipe 2, a pair of right and left tank rails 3 and a pair of right and left side tubes 4. A front fork 5 is held rotatably to head pipe 2. Front and rear wheels 6 and 7 respectively are shown. Rear wheel 7 is supported by rear arms 8. Rear arms 8 are supported on said main frame 1 by means of a pivot pin 9 in a manner to rock up and down.

Figure 5:
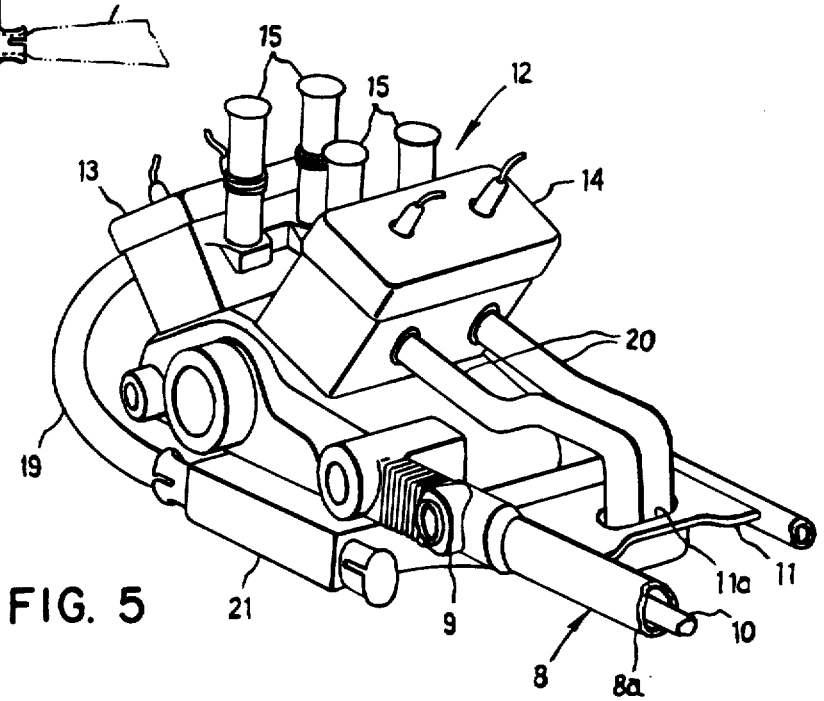
FIG. 5 is a perspective view showing an engine and its surroundings.

As better seen in FIG. 5, a drive shaft 10 is arranged to extend through one arm 8a of rear arms 8. Drive shaft 10 is used to transmit the driving force of a later-described engine to rear wheel 7. In short, the motorcycle under consideration is equipped with the so-called "power transmission mechanism of shaft drive type".

A gusset 11 is welded between the rear arms 8 in the vicinity of the pivot pin 9. The gusset 11 thus welded is formed with a hole 11a, through which later-described exhaust pipes 20 pass.

A V-type four-cycle four-cylinder water-cooled engine 12 is mounted to the frame. The banks of the engine are arranged between side tubes 4 at an inclination with respect to the longitudinal direction of the motorcycle body. Engine 12 is installed on the motorcycle with its sides suspended between the side tubes 4. Intake pipes 15 of engine 12 are located inside of the banks 13 and 14, and extend substantially vertically upward. The upper ends of the respective intake pipes open into a not-shown intake manifold which is arranged beneath a fuel tank 16. A connecting pipe 17 extends downwardly from the intake manifold. A air cleaner 18 is mounted in pipe 17. Each of intake pipes 15 is equipped with a carburetor of conventional type.

To the outer sides of the respective banks 13 and 14 of the engine 12, there are connected exhaust pipes 19 and 20 which correspond to the respective engine cylinders. There is arranged below the engine 12 a muffler 21 which is connected with exhaust pipes 19 and 20. More specifically, the two exhaust pipes 19 of front bank 13 extend around the front of the engine 12 until they are connected with muffler 21. The two exhaust pipes 20 of rear bank 14 extend through hole 11a until they are connected with muffler 21.

Figure 3:
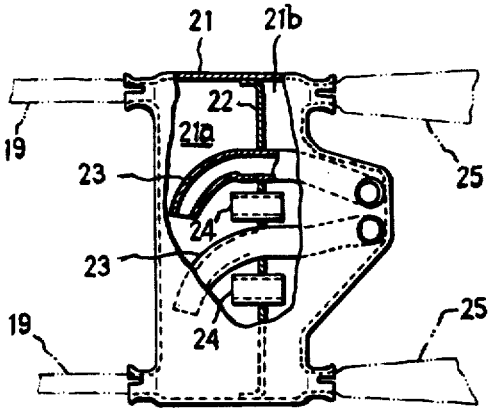
FIGS. 3 and 4 are respectively a partially sectional top plan view and side elevation showing a muffler.
Figure 4:
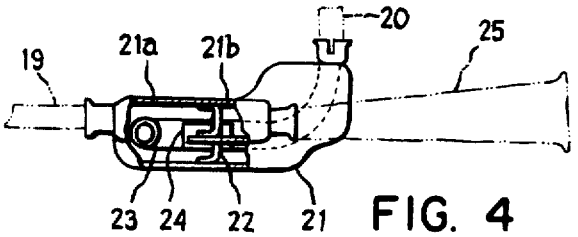

The inside of the muffler 21 (see FIGS. 3 and 4) is divided into front and rear chambers 21a and 21b by means of a partition 22, which in turn fixedly supports both two conduits 23 for introducing the engine exhaust gases from exhaust pipes 20 of rear bank 14 and two communication pipes 24 for providing communication between front and rear chambers 21a and 21b. Exhaust pipes 19 of front bank 13 are connected with front chamber 21a. Two tailpipes 25 are connected with the right and left sides of the rear chamber 21b and extend rearwardly. It should be noted here that the trailing ends of tailpipes 25 terminate forwardly of the axle of rear wheel 7.

The operation of the embodiment is as follows. Exhaust gases from engine 12 are introduced through the exhaust pipes 19 and 20 into front chamber 21a of muffler 21, where they expand. The exhaust gases thus introduced into front chamber 21a additionally expand in rear chamber 21b after they pass through communication pipes 24. Then the exhaust gases are discharged to atmosphere backwardly through the tailpipes, while their noises are further reduced. Thus, the exhaust gases introduced through exhaust pipes 19 and 20 expand in muffler 21 and in tailpipes 25, which together have a sufficient capacity that the silencing performance obtainable is sufficient. Since, moreover, the sufficient capacity required by the exhaust muffler system is shared between muffler 21 and tail pipes 25, tail pipes 25 may have a relatively small size.

Since in the foregoing embodiment the four exhaust pipes 19 and 20 of the four-cylinder engine are gathered at muffler 21, and since the exhaust gases are discharged by way of two tail pipes 25, it is sufficient that two tailpipes 25 having only a relatively small capacity be provided in the vicinity of the rear wheel 7. Contrary to the conventional construction it is unnecessary to provide four tailpipes, nor to provide such a muffler having a large capacity as has a plurality of exhaust pipes gathered thereat. As a result access to rear wheel 7 can be remarkably improved, and maintenance and repair are facilitated. Since, moreover, the trailing ends of tailpipes 25 terminate forwardly of the rear wheel axle, the maintenance and repair are still further improved.

In the foregoing embodiment, moreover, since exhaust pipes 20 of rear bank 14 are connected with muffler 21 through hole 11a which is formed in gusset 11 of rear arms 8, exhaust pipes 20 can be shortened and arranged compactly. However, engine performance may be deteriorated if exhaust pipes 19 and 20 are excessively shortened, because their length is known to have a close relationship with the engine performance. But in this invention, the length of exhaust pipes 20 can substantially be adjusted with conduits 23. The length of the other exhaust pipes 19 can also substantially be adjusted by providing conduits extending therefrom into the front chamber 21a, as the case may be. As a result, the length of exhaust pipes 19 and 20 can be selected so that the most proper performance may be attained.

As has been described hereinbefore, according to the present invention, the muffler is arranged beneath an engine having at least two exhaust pipes, and the engine exhaust gases are introduced through the exhaust pipes into the muffler and then through the tailpipes into the atmosphere from the muffler. As a result, the capacity of the exhaust muffler system can be shared between the muffler and the tailpipes so that the capacity of the tailpipes can be reduced. As a result, the size and length of the tailpipes can be reduced remarkably to facilitate maintenance and repair in the vicinity of the rear wheel, such as removal of the rear axle. Moreover it is possible to provide a muffler having a sufficient capacity while still reducing the size of the tailpipes to provide a silencing performance.

This invention is not to be limited by the embodiment shown in the drawings and described in the description, which is given by way of example and not of limitation, but only in accordance with the scope of the appended claims.

We claim:

1. An engine exhaust system for a motorcycle of the type having a frame, a front and rear wheel mounted to said frame, a V type engine with at least two cylinders arranged to form a "V", and arranged forwardly and rearwardly relative to one another, said exhaust system comprising: a muffler mounted to said frame underneath said engine, said muffler having an expansion chamber, a forward exhaust pipe extending from the forwardmost cylinder forwardly and downwardly to discharge into said expansion chamber, a rearward exhaust pipe extending from the rearwardmost cylinder downwardly to discharge into said expansion chamber, and a tailpipe having a volume and a dimension of length, exhausting from said muffler, said forward exhaust pipe and tailpipe, where they respectively enter and leave said muffler, being substantially coaxial, said rearward exhaust pipe passing downwardly rearwardly of said engine and forwardly of said rear wall.

2. An engine exhaust system according to claim 1 in which said tailpipe extends rearwardly from said muffler, and has a trailing end which terminates forwardly of the axle of said rear wheel.

3. An engine exhaust system according to claim 1 in which said muffler includes a first and a second of said expansion chambers, separated from one another by a partition, there being a communication pipe interconnecting said first and second expansion chambers, said exhaust pipes discharging into said first expansion chamber, and said tailpipe exhausting from said second expansion chamber.

4. An engine exhaust system according to claim 3 in which said tailpipe extends rearwardly from said muffler, and has a trailing end which terminates forwardly of the axle of said rear wheel.

5. An engine exhaust system according to claim 1 in which at least one of said exhaust pipes extends into said muffler for providing additional length of exhaust pipe from said engine.

6. An engine exhaust system according to claim 1 in which the engine is a four-cylinder V-type with two cylinders formed in two banks arranged forwardly and rearwardly relative to one another, and in which there is a said exhaust pipe for each said cylinder, said exhaust pipes from said forward bank curving forwardly and downwardly on opposite sides to said muffler, and said exhaust pipes from said rear bank extending rearwardly, downwardly and then forwardly to said muffler, said tailpipes extending rearwardly.

7. An engine exhaust system according to claim 6 in which said tailpipe extends rearwardly from said muffler, and has a trailing end which terminates forwardly of the axle of said rear wheel.

8. An engine exhaust system according to claim 7 in which there are two of said tailpipes, one at each side of said motorcycle.

9. An engine exhaust system according to claim 8 in which said muffler includes a first and a second of said expansion chambers, separated from one another by a partition, there being a communication pipe interconnecting said first and second expansion chambers, said exhaust pipes discharging into said first expansion chamber, and said tailpipes exhausting from said second expansion chamber.

10. An engine exhaust system according to claim 9 in which said exhaust pipes from said rear bank of exhaust pipes extend into said first expansion chamber.

11. An engine exhaust system according to claim 1 in which said rear wheel is mounted to said frame by a pair of laterally spaced-apart rearwardly extending arms which are pivoted to said frame by a pivot, said rearward exhaust pipe passing downwardly between the lanes of said arms.

12. An engine exhaust system according to claim 1 in which said rearward exhaust pipe, when it passes downwardly between the planes of said arms, passes rearwardly of the pivot which joins said arms to said frame.

13. An engine exhaust system for a motorcycle of the type having a frame, a front and rear wheel mounted to said frame, said rear wheel being mounted to said frame by a pair of laterally spaced-apart rearwardly extending arms which are pivoted to said frame by a pivot, a V type engine with at least two cylinders arranged to form a "V", and arranged forwardly and rearwardly relative to one another, said exhaust system comprising: a muffler mounted to said frame underneath said engine, said muffler having an expansion chamber, a forward exhaust pipe extending from the forwardmost cylinder forwardly and downwardly to discharge into said expansion chamber, a rearward exhaust pipe extending from the rearwardmost cylinder downwardly between said rearwardly extending arms, rearwardly of said pivot and forwardly of said rear wheel, to discharge into said expansion chamber, and a tailpipe having a volume and dimension of length, exhausting from said muffler.

14. An engine exhaust system according to claim 13 in which said tailpipe extends rearwardly from said muffler, and has a trailing end which terminates forwardly of the axle of said rear wheel.

*15. In combination with a motorcycle of the type having a frame portion, a front wheel dirigibly supported by said frame, a V-type engine supported by said frame with its crankshaft axis extending transversely to said frame, trailing arm means pivotally connected to said frame for pivotal movement about a transversely extending pivot axis, and a rear wheel journaled by said trailing arm means, an exhaust system comprising an exhaust device extending transversely across said frame for substantially the entire width of said frame and juxtaposed at a level below that of said engine and in proximity to said trailing arm pivot axis, a front bank exhaust pipe extending from the front bank of said engine downwardly and terminating in said exhaust device, a rear bank exhaust pipe extending downwardly into said exhaust device, said rear bank exhaust pipe being positioned ahead of the said rear wheel, and a tailpipe discharging rearwardly from said exhaust device.*

*16. A combination according to claim 15 wherein the engine overlies at least in part the exhaust device.*

*17. A combination according to claim 15 wherein the front bank exhaust pipe enters the exhaust device at one side thereof and the rear bank exhaust pipe enters the exhaust device at a central position therein.*

*18. A combination according to claim 17 wherein there is a second front bank exhaust pipe extending from said front bank rearwardly and entering the other side of said exhaust device and a second rear bank exhaust pipe extending rearwardly and downwardly forwardly of the rear wheel and entering said exhaust device at the center thereof.*

*19. A combination according to claim 18 wherein the engine overlies at least in part the exhaust device.*

*20. A combination according to claim 18 wherein the engine drives a drive shaft that extends to one side of said frame for driving said rear wheel, one of the rear bank exhaust pipes being offset relative to the other of said rear bank exhaust pipes away from said drive shaft for providing clearance therebetween.*

*21. A combination according to claim 20 wherein a pair of tailpipes extend from the opposite sides of the exhaust device and rearwardly on opposite sides of the rear wheel.*

* * * * *